Aug. 19, 1941.   A. W. THORESON   2,253,101
SHIELD FOR GLASSES
Filed April 25, 1939
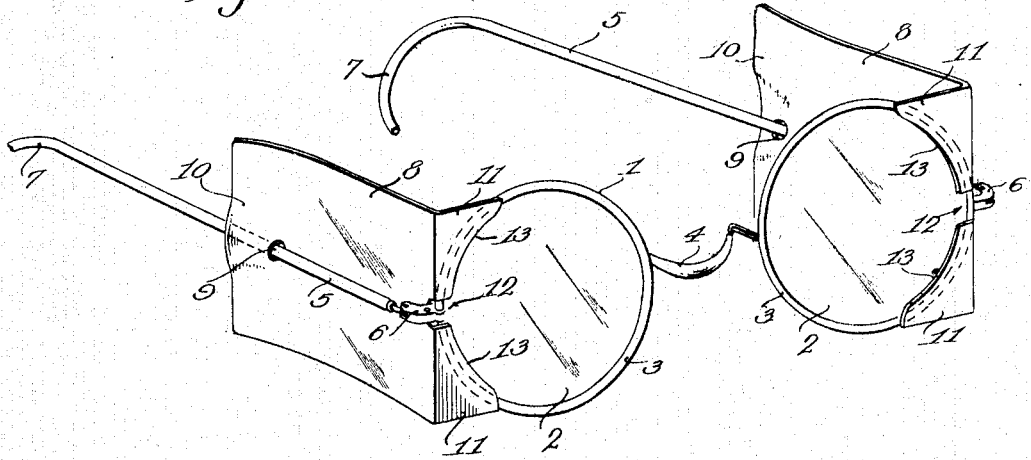
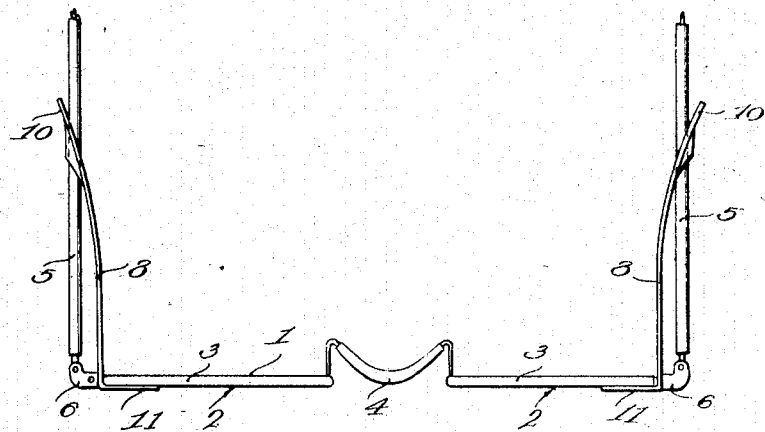
Albert W. Thoreson
INVENTOR
BY Victor J. Evans & Co.
ATTORNEYS Patented Aug. 19, 1941

2,253,101

UNITED STATES PATENT OFFICE 2,253,101

SHIELD FOR GLASSES

Albert W. Thoreson, Thief River Falls, Minn.

Application April 25, 1939, Serial No. 270,002

2 Claims. (Cl. 2—13)

This invention relates to shields for spectacles, more particularly adapted for use by railroad enginemen, trainmen and vehicle drivers in general, but also for other obvious uses.

The prime object of the invention is to provide a simple yet practical and efficient device which is readily applied detachably to the temple bar of the spectacles to eliminate side glare and as an effective shield against injury to the eyes by wind, cinders and dust particles.

The invention consists in the novel structure of the device and in its particular application to the spectacles as hereinafter described and set forth and defined in the appended claims, reference being had to the accompanying drawing illustrating a practical embodiment of the invention, in which—

Figure 1 is a perspective view showing the shield applied to the spectacles;

Figure 2 is a top plan view of the assembly shown in Figure 1; and

Figure 3 is a detail perspective view of the shield detached.

Referring now to the drawing, the numeral 1 designates generally an ordinary spectacle frame carrying the lenses 2, the lens carrying portions, as shown, comprising annular rims 3 which are connected by a bridge or nosepiece 4 and have the usual temple bars 5 hingedly attached to their outer portions in the usual manner, as at 6. The temple bars 5 may or may not have the usual bows or ear engaging portions 7, and, obviously, the rims 3 surrounding the lenses 2 may be eliminated and the bridge or nosepiece 4 and temple bars 5 attached directly to the lenses as in the usual rimless mounting, the structure of the spectacles per se forming no part of the present invention.

The two shields 8, to be now described, are exactly alike in structure, thereby obviating the necessity of making them separately in "rights" and "lefts." Therefore, a description of one will suffice.

The shield may be made of any suitable sheet material possessing the requisite stability with flexibility, and, preferably, with certain inherent resiliency. The material may be opaque or translucent and specially colored. As shown, the shield is in the form of an elongated platelike body which is generally rectangular and provided near its inner end with an apertured portion 9 which is slipped over the temple bar 5 with the outer end portion 10 of the shield on the outside of the bar and the main body of the shield extending inside the bar to the front of the lens 2; and the forward end portion of the shield being flanged inwardly, as at 11, and projected over the front of the adjacent peripheral portion of the lens, for which purpose the shield is notched, as at 12, so as to straddle the hinged end portion of the temple bar.

The inner edge portion of the flange 11 is concaved, as at 13, with curvature concentric with the marginal portion of the lens which it overlaps, as shown more clearly in Figure 1, and the bottom of the notch 12 terminates in the body portion of the shield just a sufficient distance inwardly from the flange 11 so that, when the shield is applied, the bottom of the notch engages the hinge 6 of the temple bar 5 to prevent forward movement of the applied shield and at the same time hold the concaved marginal portion of the flange 11 in overlapping contact with the adjacent marginal portion of the lens so as to prevent rearward movement of the applied shield and also provide a seal against the passage of wind, cinders or dust particles therebetween. There is a further advantage in the provision of the flange 11 in that it effectively closes the gap which would otherwise occur between the forward end portion of the shield body proper and the adjacent peripheral portions of the lens 2 above and below the hinged attachment of the temple bar to the rim 3 or directly to the lens 2, as the case may be, and at the same time the flat major body portion of the shield is maintained in a vertical plane and is without any inward projection which might cause annoyance and discomfort to the wearer.

From the foregoing description it is obvious that a practical shield is produced which is simple in construction, economically manufactured and readily applied to and removed from spectacles, at will. It is further obvious that while the structure illustrated in the drawing embodies a practical adaptation of the invention, modification and alteration may be made therein without departing from the spirit and scope of the invention as defined by the appended claims. The invention, therefore, is not limited to the specific construction and arrangement shown.

What is claimed is:

1. As an article of manufacture, a shield of the character described for spectacles, the same comprising a generally rectangular, normally flat, platelike body, the major portion thereof when the device is applied to be located and disposed in a vertical plane at the inner side of the temple bar of the spectacles and having provision adjacent its rear end for detachably securing it to the temple bar, the forward end portion of the body being cut out roundedly and formed with a medial longitudinal notch to fit over the juncture of the temple bar with the adjacent eye member and said forward body portion being bent inwardly substantially at a right angle to form triangular wings at opposite sides of the notch with concave margins to concentrically adjoin and engage in overlapping contact with the adjacent peripheral portions of the eye member in front thereof.

2. The herein described shield for spectacles, comprising an inherently resilient, generally rectangular, normally flat, platelike body having an apertured rear end portion to fit slidably over the temple bar of the spectacles, the forward end portion of the body being cut out roundedly and formed with a notch to fit over the juncture of the temple bar with the adjacent eye member, the aperture and notch being coincident with the longitudinal axis of the platelike body and the forward portions of the body on opposite sides of the notch being bent inwardly substantially at a right angle to form triangular wings having concaved margins, the concaved marginal portions to concentrically overlap in cooperatively engaging contact with the adjacent peripheral portions of the eye member in front thereof, the major body portion of the applied shield being located and disposed in a vertical plane at the inner side of the temple bar but its end portion rearward of the aperture through which the temple bar is inserted being located at the outer side of the temple bar and sprung so that the reactive effect is to force the forward end portion of the body adjacent the notch inwardly and hold it against the immediately adjacent peripheral portion of the eye member.

ALBERT W. THORESON.